US007457700B2

(12) United States Patent
Frauenkron et al.

(10) Patent No.: US 7,457,700 B2
(45) Date of Patent: Nov. 25, 2008

(54) METHOD AND DEVICE FOR OPERATING AN INTERNAL COMBUSTION ENGINE

(75) Inventors: Helge Frauenkron, Burscheid (DE); Robert Kuenne, Bretzfeld-Scheppach (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 11/407,721

(22) Filed: Apr. 19, 2006

(65) Prior Publication Data

US 2006/0293827 A1 Dec. 28, 2006

(30) Foreign Application Priority Data

May 18, 2005 (DE) ...................... 10 2005 022 691

(51) Int. Cl.
*G06F 19/00* (2006.01)
*F02D 41/04* (2006.01)

(52) U.S. Cl. ........................ 701/103; 701/110; 701/115

(58) Field of Classification Search .............. 123/339.2, 123/478, 480, 486, 674; 701/101-105, 110, 701/111, 114, 115; 60/603, 605.1, 605.2
See application file for complete search history.

(56) References Cited

U.S. PATENT DOCUMENTS 4,048,964 A * 9/1977 Kissel ........................ 123/482
5,036,808 A * 8/1991 Stumpp .................. 123/198 D
5,606,951 A * 3/1997 Southern et al. ............ 123/399
5,974,870 A * 11/1999 Treinies et al. ............. 73/118.2
6,240,895 B1 * 6/2001 Oder .......................... 123/295
6,378,306 B2 * 4/2002 Koelle et al. ............... 60/605.1
6,378,496 B1 * 4/2002 Joos et al. .................... 123/435
6,823,847 B2 * 11/2004 Carlo ......................... 123/458
7,044,118 B2 * 5/2006 Tonetti et al. ............... 123/674
7,174,713 B2 * 2/2007 Nitzke et al. ............... 60/605.2
7,308,354 B2 * 12/2007 Daneau et al. .............. 701/109
2004/0186653 A1 * 9/2004 Bleile et al. ................. 701/103
2005/0115542 A1 * 6/2005 Hochstrasser et al. .. 123/406.23

* cited by examiner

*Primary Examiner*—Willis R Wolfe, Jr.
(74) *Attorney, Agent, or Firm*—Kenyon & Kenyon LLP

(57) ABSTRACT

A method and a device for operating an internal combustion engine provide that a value for a first performance quantity of the internal combustion engine is modeled as a function of at least one second performance quantity different from the first performance quantity, e.g., a charge of the internal combustion engine. This modeling is corrected as a function of a comparison of the modeled value for the first performance quantity with a measured value for the first performance quantity. The correction is performed differently for different operating points of the internal combustion engine.

18 Claims, 3 Drawing Sheets

METHOD AND DEVICE FOR OPERATING AN INTERNAL COMBUSTION ENGINE

FIELD OF THE INVENTION

The present invention relates to a method and a device for operating an internal combustion engine in such a way that a first performance quantity of the engine is modeled as a function of a second performance quantity.

BACKGROUND INFORMATION

Conventional methods and devices for operating an internal combustion engine provide that a value for an intake-manifold pressure of the internal combustion engine is modeled as a function of a charge and a partial pressure of an internal and/or an external residual gas in a combustion chamber of the internal combustion engine. This modeling is corrected as a function of a comparison of the modeled value for the intake-manifold pressure with a measured value for the intake-manifold pressure, the measured value for the intake-manifold pressure being detected by an intake-manifold pressure sensor.

SUMMARY OF THE INVENTION

The method and the device according to the present invention for operating an internal combustion engine provide the advantage that the modeling correction is performed differently for different operating points of the internal combustion engine. In this manner, it is possible to adapt the correction of the modeling to different operating points of the internal combustion engine so that maximum precision is achieved in the correction of the modeling for each operating point.

It is particularly advantageous if a pressure in an air supply to the internal combustion engine is selected as the first performance quantity. This quantity is used in many functions of the internal combustion engine. It may thus be made available for various operating points of the internal combustion engine with optimum precision.

Another advantage is obtained when the measured value for the pressure is ascertained by a first pressure sensor downstream from a controlling element, e.g., a throttle valve, for influencing the flow behavior of the air supplied to the internal combustion engine. In this way, a reliable measured value for the intake-manifold pressure may be determined for the entire operating range of the internal combustion engine for the case when the pressure is an intake-manifold pressure, so the correction of the modeling of the intake-manifold pressure described here may be optimized over the entire operating range of the internal combustion engine.

Another advantage is obtained when the measured value for the pressure is ascertained by a second pressure sensor upstream from a controlling element, e.g., a throttle valve, for influencing the flow behavior of the air supplied to the internal combustion engine. In this way, the intake-manifold pressure may be determined by a boost pressure sensor formed by the second pressure sensor, so a separate intake-manifold pressure sensor is not required.

It is also advantageous if the measured value for the pressure is ascertained only for operating points of the internal combustion engine at which the controlling element assumes a position in which it has only insignificant influence on the flow behavior of the air supplied to the internal combustion engine. In this way, it is possible to ensure that, independent of the pressure sensor used, the measured value thus determined will essentially reproduce the pressure, so the correction in the modeling of the pressure will yield reliable results independently of the pressure sensor used for ascertaining the measured value for the pressure.

This is ensured in particular when the measured value for the pressure is ascertained by the second pressure sensor only for operating points of the internal combustion engine at which the controlling element is completely open.

Another advantage is obtained when the modeling includes a conversion factor for conversion between the at least one second performance quantity and the first performance quantity and when the conversion factor is corrected as a function of the comparison of the modeled value for the first performance quantity with the measured value for the first performance quantity. This is a particularly simple and uncomplicated procedure for modeling and correcting the first performance quantity.

The reliability of the modeling of the first performance quantity and its correction may be increased if, in addition to the second performance quantity, a third performance quantity of the internal combustion engine, e.g., a partial pressure of an internal and/or an external residual gas in a combustion chamber of the internal combustion engine, is also taken into account in the modeling, and if this third performance quantity is corrected as a function of the comparison of the modeled value for the first performance quantity with the measured value for the first performance quantity.

Another advantage is obtained when the modeling is corrected as a function of an operating point defined by an engine speed and/or a charge of the internal combustion engine. In this way, the prevailing operating point of the internal combustion engine may be taken into account in a particularly reliable and precise manner in correcting the modeling of the first performance quantity of the internal combustion engine.

DETAILED DESCRIPTION

Figure 1:
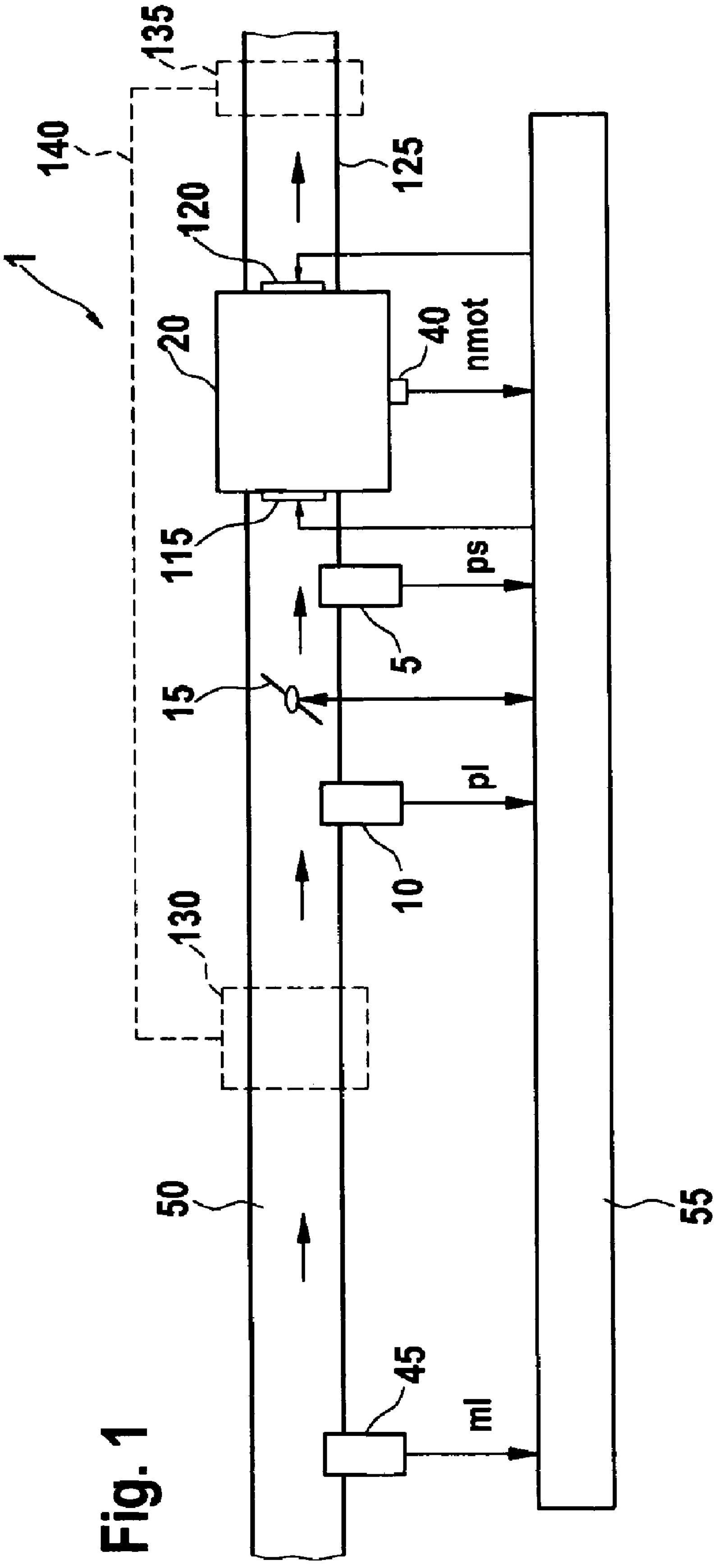
FIG. 1 shows a schematic illustration of an internal combustion engine.

FIG. 1 shows an internal combustion engine 1 driving a motor vehicle, for example. Internal combustion engine 1 may be designed as a gasoline engine or a diesel engine. Internal combustion engine 1 includes a combustion chamber 20, e.g., as part of a cylinder. Internal combustion engine 1 may also include multiple cylinders, each having one combustion chamber. FIG. 1 shows combustion chamber 20 of a cylinder as an example. Air is supplied from an air channel or an air supply 50 via an intake valve 115 to combustion chamber 20. The opening and closing times of intake valve 115 are triggered by an engine control unit 55. Alternatively, the opening and closing times of intake valve 115 may also be predefined via a camshaft (not shown in FIG. 1). The direction of flow of the air in air channel 50 is indicated by arrows. An air flow meter 45, e.g., a hot-film air flow meter, measures the air flow rate in air supply 50 and relays the measured value to engine control unit 55. Optionally (as shown with dashed lines in FIG. 1), a compressor 130 for compressing the air supplied to combustion chamber 20 is situated downstream from air flow meter 45. Compressor 130 may be driven, for example, by a crankshaft (not shown in FIG. 1) of internal combustion engine 1, by an electric motor or, as depicted in FIG. 1, by a turbine 135 in an exhaust system 125 of internal combustion engine 1 via a shaft 140.

Downstream from optional compressor 130, a second pressure sensor 10 is situated in air channel 50 according to FIG. 1, measuring the pressure at this location in air channel 50 and relaying the measured value to engine control unit 55. Downstream from second pressure sensor 10, a controlling element 15, e.g., in the form of a throttle valve, is situated in air channel 50, the flow behavior of the air supplied to the internal combustion engine being influenced as a function of the position of this throttle valve. The position of throttle valve 15 is adjusted by engine control unit 55, e.g., as a function of the driver's intent. Conversely, the position of throttle valve 15 is relayed back to engine control unit 55, for example, with the aid of a potentiometer. The position of throttle valve 15 is also referred to as the degree of opening.

Downstream from throttle valve 15, a first pressure sensor 5 is situated in air channel 50, measuring the pressure at this point in air channel 50 and relaying the measured value to engine control unit 55. Intake valve 115 of combustion chamber 20 is situated in air channel 50 downstream from first pressure sensor 5. First pressure sensor 5 is thus situated downstream from throttle valve 15, and second pressure sensor 10 is situated upstream from throttle valve 15. It is assumed below as an example that either only first pressure sensor 5 or only second pressure sensor 10 is provided. However, as shown in FIG. 1, both pressure sensors 5, 10 may also be present in air channel 50. The portion of air channel 50 downstream from throttle valve 15 is also referred to as the intake manifold, so the pressure measured by first pressure sensor 5 is also referred to as the intake-manifold pressure. First pressure sensor 5 is therefore also referred to as an intake-manifold pressure sensor. The pressure between compressor 130 and throttle valve 15 is also referred to as the boost pressure, so that second pressure sensor 10 is also referred to as the boost pressure sensor.

Fuel is injected into air channel 50, i.e., into the intake manifold and/or directly into combustion chamber 20 via one or more fuel injectors (not shown in FIG. 1). The exhaust gas formed in the combustion of the air/fuel mixture in combustion chamber 20 is expelled via an exhaust valve 120 into exhaust system 125, where it drives optional turbine 135. The direction of flow of the exhaust gas in exhaust system 125 is represented by arrows in FIG. 1, while the opening and closing times of exhaust valve 120 are adjusted by engine control unit 55, as depicted in FIG. 1. Alternatively, the opening and closing times of exhaust valve 120 may also be predefined via the camshaft.

Engine control unit 55 integrated into the vehicle electrically supports the operation of internal combustion engine 1. It may contribute toward low-emission combustion or toward maximum performance yield, depending on the operating mode of the internal combustion engine. It is essential for the physical parameters of the engine to be very well known in engine control unit 55. This may be ensured, first, by having these physical parameters of the engine measured by installed sensors. For example, according to FIG. 1, the air flow rate is measured by air flow meter 45, the intake-manifold pressure is measured by first pressure sensor 5, and the boost pressure is measured by second pressure sensor 10. Additionally or alternatively, these physical engine parameters may also be modeled in engine control unit 55 from other measured or modeled performance quantities of internal combustion engine 1. Since sensors as hardware components are usually very expensive, it is customary to rely as much as possible on modeling the corresponding performance quantities of internal combustion engine 1.

The intake-manifold pressure is an important basic quantity for operation of internal combustion engine 1 which is used by several functions of internal combustion engine 1. The intake-manifold pressure is known to be modeled with the help of multiple engine characteristics maps which take into account the variable elements which are installed in internal combustion engine 1 and influence the charge of combustion chamber 20. The charge of combustion chamber 20 depends on the valve lift of intake valve 115, for example. For the most accurate possible modeling of the intake-manifold pressure, it is therefore advantageous to take into account the valve lift of intake valve 115 in the modeling, in particular when different valve lifts of intake valve 115 are settable. The charge of combustion chamber 20 and thus the intake-manifold pressure are also influenced by the period of time during which both intake valve 15 and exhaust valve 120 are open, i.e., there is an overlap or intersection of the opening times of intake valve 115 and exhaust valve 120. This overlap depends on the camshaft adjustment, i.e., on the triggering of intake valve 115 and exhaust valve 120 by engine control unit 55, and may also be taken into account for the most accurate possible modeling of the intake-manifold pressure in an advantageous manner.

In addition, the charge of combustion chamber 20 and thus the intake-manifold pressure may be influenced by a possible intake-manifold switching, in which the length of the intake manifold is adjusted differently for different engine speeds. For the most accurate possible modeling of the intake-manifold pressure, it is therefore also advantageous to take into account such intake-manifold switching. The charge and thus the intake-manifold pressure also depend on the position of throttle valve 15 and the performance of compressor 130, which is also present, if necessary, so these may be used for the most accurate possible modeling of the intake-manifold pressure in an advantageous manner. In an internal combustion engine which includes a plurality of adjustment options, listed as examples, for influencing the charge and thus the intake-manifold pressure, the calibration of the modeling of the intake-manifold pressure is therefore complex. Furthermore, this modeling results in a scatter which is greater, the greater the number of available adjustment options. The resulting deviation between the actual intake-manifold pressure and the modeled intake-manifold pressure is learned by adaptation or correction of the conversion factors used in modeling.

The accuracy in calibrating the model for modeling of the intake-manifold pressure, hereinafter also referred to as the intake-manifold pressure model, is negatively impacted by the component tolerance of all sensors included in the modeling of intake-manifold pressure, e.g., air flow meter 45 and both pressure sensors 5, 10 and the adjustment elements involved in implementing the adjustment options described here as well as the manufacturing tolerances of the engine parts such as the pistons, crankshaft, intake-manifold surfaces, and cylinder surfaces. These adjustment elements contribute toward adjusting the valve lift of intake valve 115, adjusting the camshaft and adjusting the intake manifold, for example. In the case of supercharged engines in particular, i.e., when using compressor 130, this results in the actual performance of internal combustion engine 1 deviating from the desired target performance at full load. The reason for this is that the conversion from relative air in combustion chamber 20, also referred to as charge, to intake-manifold pressure is accomplished using fixedly calibrated engine characteristics maps. The influence of component scattering is reduced by calibrating on a mid-tolerance engine and using the result for various internal combustion engines.

The deviation of the actual output power of internal combustion engine 1 from the desired setpoint power at full load of internal combustion engine 1 may be reduced significantly through the adaptation of the conversion factors used as described above for converting the charge of combustion chamber 20 into the intake-manifold pressure. This adaptation is performed by comparing the modeled value for the intake-manifold pressure with a measured value for the intake-manifold pressure and correcting the modeling of the intake-manifold pressure and/or the conversion factor(s) used for this modeling as a function of the results of the comparison. This adaptation has so far been performed at one operating point of internal combustion engine 1 and then applied to all other operating points of the internal combustion engine. Therefore, according to the present invention, adaptation and/or correction of the modeling of the intake-manifold pressure is performed as a function of the operating point, in such a way that the correction is performed differently for different operating points of the internal combustion engine.

Figure 2:
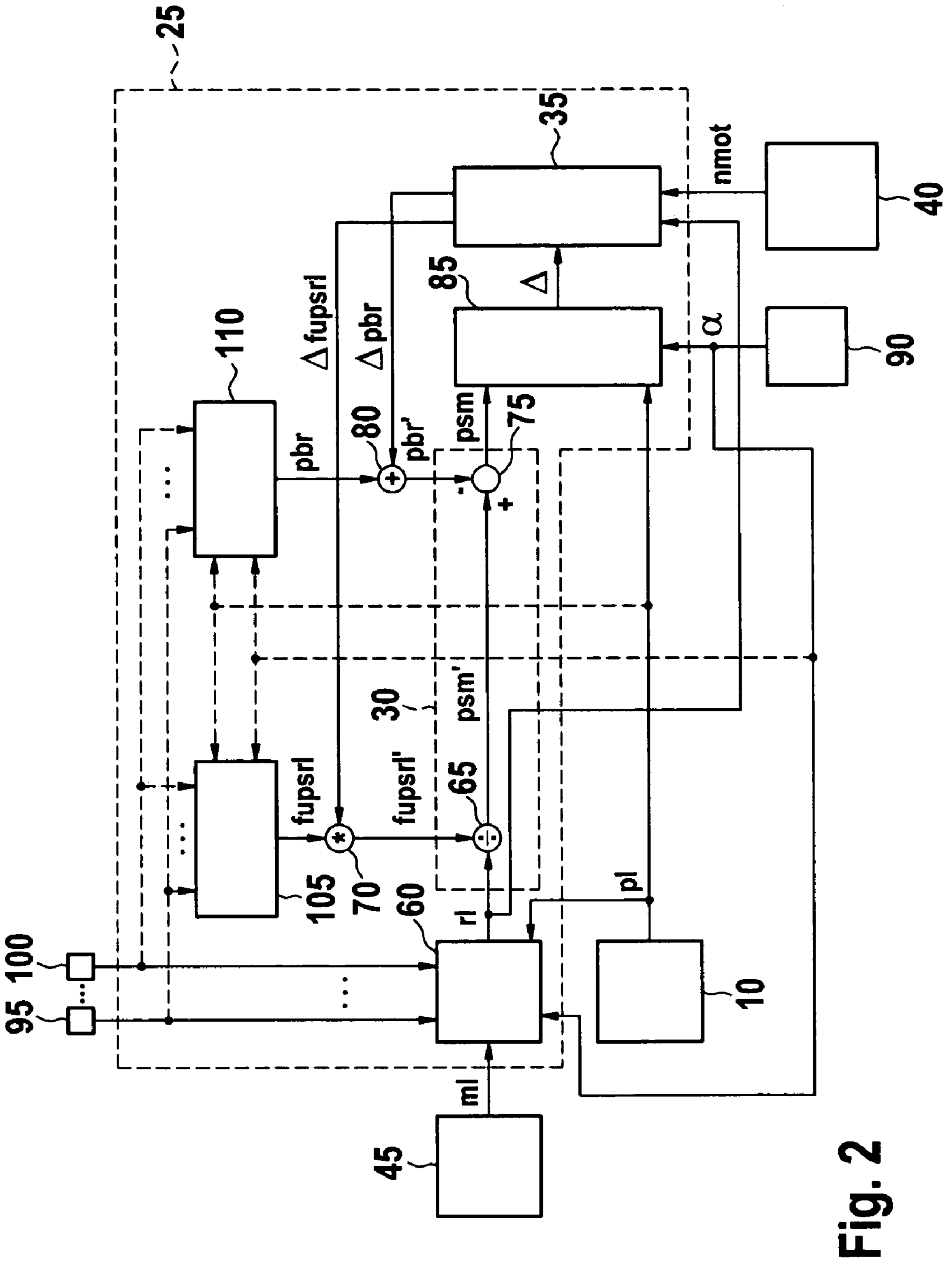
FIG. 2 shows a schematic diagram to illustrate the method according to the present invention and the device according to the present invention.

The implementation of such an adaptation and/or correction of the modeling of the intake-manifold pressure is illustrated on the basis of the schematic diagram shown in FIG. 2. A device 25 provided here may be implemented as software and/or hardware in engine control unit 55, for example. Device 25 includes a first modeling unit 30 which converts a modeled value rl for the charge of combustion chamber 20 into a modeled value psm for the intake-manifold pressure. For this conversion, first modeling unit 30 includes a division element 65 which receives as input quantities modeled value rl for the charge and an adapted, i.e., corrected, conversion factor fupsrl'. Division element 65 forms the quotient of the two input quantities supplied and delivers it as intermediate value psm'=rl/fupsrl' at its output. This intermediate value psm' may be used unchanged as modeled value psm for the intake-manifold pressure. However, the modeling is more reliable if in addition, and as shown in FIG. 2, intermediate value psm' is sent to a subtraction element 75 which also receives an adapted, i.e., corrected, value pbr' for a partial pressure of an internal and/or an external residual gas in combustion chamber 20. Subtraction element 75 then forms the difference between supplied intermediate value psm' for the intake-manifold pressure and adapted partial pressure pbr' of the internal and/or external residual gas of combustion chamber 20 and delivers this difference, (psm'-pbr'), as modeled value psm for the intake-manifold pressure at its output. Adapted value pbr' for the partial pressure may thus correspond only to an adapted partial pressure pbrint' of the internal residual gas in combustion chamber 20, in particular when exhaust gas recycling is not provided. If exhaust gas recycling is provided, adapted value pbr' for the partial pressure may also correspond only to an adapted value pbrext' for the partial pressure of the external residual gas in the cylinder, which is due to the exhaust gas recycling.

If, however, in the case of exhaust gas recycling, there is also internal residual gas in combustion chamber 20 due to exhaust gas flowing back into combustion chamber 20 through exhaust valve 120, then adapted value pbr' may also be selected as the sum of both the partial pressure of the internal residual gas and the partial pressure of the external residual gas. Thus in the latter case, pbr'=pbrint'+pbrext'. This yields modeled value psm for the intake-manifold pressure as follows:

$$psm=rl/fupsrl'-pbr' \quad (1)$$

Device 25 shown in FIG. 2 includes a second modeling unit 60 which converts the variation over time of the measured air flow rate ml, which is supplied by air flow meter 45 to device 25 and/or to second modeling unit 60, to the corresponding variation over time of charge rl, where additional performance quantities of internal combustion engine 1, which influence the charge of combustion chamber 20 and are therefore taken into account in the conversion of the variation over time of air flow rate ml into the variation over time of modeled value rl for the charge, are sent to second modeling unit 60. These performance quantities include, as already described above, for example, the valve lift of intake valve 115, the camshaft adjustment or, more generally, the crankshaft angle range or time range in which both intake valve 115 and exhaust valve 120 are open, the length of the intake manifold depending on the intake-manifold switching, the position of throttle valve 15, the performance of compressor 130, i.e., the boost pressure thereby generated. The corresponding performance quantities are sent to second modeling unit 60 by corresponding adjusting elements or sensor elements 95 through 100, which are situated outside of device 25 in the example according to FIG. 2. For example, an actual value pl for the boost pressure is supplied by boost pressure sensor 10 to second modeling unit 60. In addition, an actual value $\alpha$ for the position of throttle valve 15 of second modeling unit 60 is also supplied to second modeling unit 60 by a corresponding sensor 90, e.g., a throttle valve potentiometer, as shown in FIG. 2. Boost pressure sensor 10 and throttle valve potentiometer 90 are also situated outside of device 25 in the example according to FIG. 2.

Second modeling unit 60 thus ultimately represents a multidimensional engine characteristics map calibrated on a test bench, for example, i.e., a multidimensional engine characteristics space which converts the performance quantities of internal combustion engine 1 supplied to second modeling unit 60 by sensors and/or adjusting elements 95 through 100, air flow meter 45, boost pressure sensor 10 and throttle valve potentiometer 90 into modeled value rl for the charge of combustion chamber 20 and delivers it at the output of second modeling unit 60. When the variation over time, in particular at discrete sampling times, of the aforementioned performance quantities are available a corresponding variation over time of modeled value rl for the charge is obtained at the output of second modeling unit 60.

Modeled value psm for the intake-manifold pressure, i.e., its variation over time, is supplied from the output of subtraction element 75 to a comparator unit 85. Comparator unit 85 also receives the variation over time of actual value pl of the boost pressure supplied by boost pressure sensor 10. Comparator unit 85 compares modeled value psm of the intake-manifold pressure with actual value pl of the boost pressure for each sampling point in time. The comparison is advantageously performed only when the flow behavior of the air supplied to the internal combustion engine is influenced only insignificantly by the position of throttle valve 15 at the sampling point in time being considered in the present case. This is the case, for example, when throttle valve 15 is completely open. In general, a range for the degree of opening of throttle valve 15 in which the flow behavior of the air supplied to the internal combustion engine is influenced only insignificantly by the position of throttle valve 15 is calibratable on a test bench, for example. This range also includes completely open throttle valve 15.

An insignificant influence of the position of throttle valve 15 on the air supplied to internal combustion engine 1 is ascertainable by comparing actual value pl supplied by boost pressure sensor 10 for the boost pressure with actual value ps for the intake-manifold pressure supplied with intake-manifold pressure sensor 5 which is installed only for this purpose. For all such positions or degrees of opening of throttle valve 15 for which actual value pl of the boost pressure corresponds essentially to actual value ps of the intake-manifold pressure, it is found that the flow behavior of the air supplied to internal combustion engine 1 is influenced only insignificantly by the corresponding position of throttle valve 15. These positions or degrees of opening of throttle valve 15, i.e., the range between the smallest of these degrees of opening and the largest of these degrees of opening, then form the predefined range for degree of opening α of throttle valve 15 within which modeled value psm for the intake-manifold pressure is compared by comparator unit 85 with measured actual value pl of the boost pressure. To this end, degree of opening α of throttle valve 15 is supplied by throttle valve potentiometer 90 to comparator unit 85. If degree of opening α of throttle valve 15 supplied to comparator unit 85 is outside of the aforementioned range, then comparator unit 85 is deactivated; otherwise it is activated and performs the comparison described above. Difference Δ=psm−pl between modeled value psm for the intake-manifold pressure and measured value pl of the boost pressure, determined by comparator unit 85 in its activated state, is sent to a correction unit 35. Correction unit 35 ascertains a correction value Δfupsrl for a conversion factor fupsrl supplied by a first ROM 105 as a function of difference Δ. This conversion factor fupsrl may be calibrated uniformly as a fixed value, for example, on a test bench, e.g., via multiple engine characteristics maps for all operating states of internal combustion engine 1. It is needed for conversion of modeled value rl for the charge to modeled value psm for the intake-manifold pressure. In a multiplier element 70, conversion factor fupsrl is multiplied by correction factor Δfupsrl, yielding adapted, i.e., corrected, conversion factor fupsrl' as a result at the output of multiplication element 70, this conversion factor then being sent to division element 65 in the manner described previously.

For the case when the partial pressure of the internal and/or external residual gas in combustion chamber 20 is also taken into account in modeling the intake-manifold pressure, correction unit 35 additionally ascertains a correction value Δpbr as a function of difference Δ. This correction value is then added in an addition element 80 to a partial pressure pbr from a second ROM 110, said partial pressure being calibrated uniformly as a fixed value over all operating ranges of internal combustion engine 1, yielding adapted, i.e., corrected, partial pressure pbr' as the sum at the output of addition element 80, this corrected partial pressure then being sent to subtraction element 75 in the manner described above. Fixed value pbr for the partial pressure is in turn a partial pressure for the internal and/or external residual gas content in combustion chamber 20 in the same way as adapted, i.e., corrected, partial pressure pbr'.

Correction value Δfupsrl for the conversion factor and, if available, correction value Δpbr for the partial pressure are ascertained by correction unit 35 not only as a function of difference Δ but also, according to the present invention, as a function of the operating point of internal combustion engine 1. The operating point of internal combustion engine 1 is ascertained as a function of at least one performance quantity of internal combustion engine 1. This may be, for example, engine speed nmot of internal combustion engine 1, which is detected, as also shown in FIG. 1, by an engine speed sensor 40 in the area of the cylinders of internal combustion engine 1 and sent to engine control unit 55. Additionally or alternatively, the instantaneous operating point of internal combustion engine 1 may also be determined as a function of charge rl at the output of second modeling unit 60. In the example according to FIG. 2, it should be assumed that the instantaneous operating point of internal combustion engine 1 is ascertained by modeled value rl of the charge at the output of second modeling unit 60 and by actual value nmot of the engine speed at the output of engine speed sensor 40. To this end, modeled value rl for the charge and measured actual value nmot for the engine speed are sent to correction unit 35. Correction unit 35 then ascertains correction value Δfupsrl for the conversion factor and, if necessary, correction factor Δpbr for the partial pressure as a function of the prevailing operating point of internal combustion engine 1 determined in this way as well as depending on difference Δ; each of correction values Δfupsrl, Δpbr may be positive or negative and may differ in absolute amount, depending on the instantaneous operating point of internal combustion engine 1 and depending on difference Δ.

Figure 3:
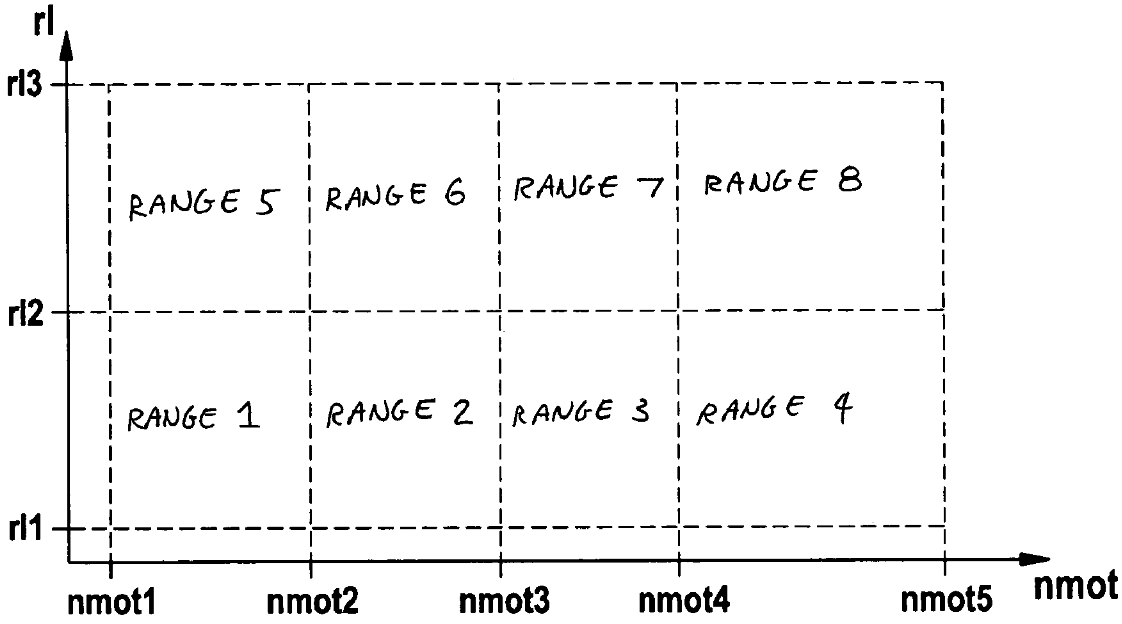
FIG. 3 shows a charge-engine speed diagram to illustrate various operating ranges of the internal combustion engine.

For the sake of simplicity, it is possible to provide, as shown in FIG. 3, for various operating points of internal combustion engine 1 to be combined into at least one operating range of internal combustion engine 1. Correction unit 35 then ascertains correction values Δfupsrl, Δpbr as a function of the instantaneous operating range of internal combustion engine 1 and difference Δ. According to FIG. 3, a diagram of modeled value rl for the charge is shown as a function of the measured actual value nmot for the engine speed, where five predefined engine speed values nmot1, nmot2, nmot3, nmot4, nmot5 as well as three predefined values for charge rl1, rl2, rl3 define a total of eight different operating ranges of internal combustion engine 1 which do not overlap. Correction unit 35 thus determines the absolute value and sign of correction value Δfupsrl of the conversion factor and, if necessary, the absolute value and sign of correction value Δpbr of the partial pressure as a function of difference Δand the prevailing operating range of internal combustion engine 1. For example, a first engine characteristics map is provided in correction unit 35, having been calibrated on a test bench, for example, and having received as input quantities difference Δ and the instantaneous operating range of internal combustion engine 1 and outputting correction value Δfupsrl for the conversion factor at the output. Accordingly, correction unit 35 includes, for example, a second engine characteristics map which receives difference Δ and the prevailing operating range of internal combustion engine 1 as input quantities and delivers at the output difference value Δpbr as a function of these performance quantities. The second engine characteristics map here has also been calibrated on a test bench, for example.

According to an alternative example embodiment, instead of boost pressure sensor 10, intake-manifold pressure sensor 5 may be used, supplying a measured actual value ps of the intake-manifold pressure to comparator unit 85 so that modeled value psm for the intake-manifold pressure is compared in comparator unit 85 with measured actual value ps for the intake-manifold pressure. This comparison may be performed independently of position α of throttle valve 15 and therefore for any operating state or operating point of internal combustion engine 1. In this case, position α of throttle valve 15 need not be sent to comparator unit 85. Value Δ is then obtained from difference psm-ps, i.e., the difference between modeled value psm for the intake-manifold pressure and measured actual value ps for the intake-manifold pressure. The present invention has been described using the example of modeling the intake-manifold pressure. The invention may of course also be implemented similarly for modeling another performance quantity of internal combustion engine 1 and correcting it as a function of the operating point of internal combustion engine 1. For example, instead of the intake-manifold pressure, the boost pressure may be modeled in the manner described here and the modeling corrected in the manner described here. To this end, only fixed value fupsrl is to be calibrated suitably as a conversion factor and, if necessary, fixed value pbr is to be calibrated suitably for the partial pressure, so the boost pressure is obtained instead of the intake-manifold pressure. Furthermore, in this alternative implementation, the roles of the boost pressure sensor and the intake manifold sensor are switched. This means that when comparator unit 85 receives measured actual value pl of the boost pressure, the comparison is performed in comparator unit 85 over all operating points of the internal combustion engine without degree of opening $\alpha$ of throttle valve 15 having to be supplied to comparator unit 85. However, if measured actual value ps of intake manifold sensor 5 is supplied to comparator unit 85, then the comparison may be performed in comparator unit 85 only when there is essentially no pressure gradient across throttle valve 15 as described previously, i.e., actual value ps of the intake-manifold pressure is essentially equal to actual value pl of the boost pressure, which is in turn the case only in the predefined range described above for degree of opening $\alpha$ of throttle valve 15. Thus again in this case, this degree of opening $\alpha$ must be sent to comparator unit 85. In this alternative embodiment, modeled value rl for the charge is first converted into an intermediate value plm' for the boost pressure downstream from division element 65 and then converted to a modeled value plm for the boost pressure at the output of subtraction element 75.

It has been described previously that conversion factor fupsrl and, if necessary, partial pressure pbr are each predefined as fixed values. For all exemplary embodiments described above, however, conversion factor fupsrl and, optionally, partial pressure pbr may also be predefined as a function of adjusting elements and/or sensors 95 through 100 and as a function of position $\alpha$ of throttle valve 15 and, optionally, as a function of the compressor performance according to measured actual value pl of the boost pressure in a manner known to those skilled in the art, e.g., each via a multidimensional engine characteristics map or space calibrated on a test bench. In this case, instead of first ROM 105, a first multidimensional engine characteristics map is provided, and instead of second ROM 100, a second such multidimensional engine characteristics map is provided. Using dashed lines, FIG. 2 shows the formation of conversion factor fupsrl and, optionally, partial pressure pbr as a function of the adjusting elements, i.e., sensors 95 through 100, and also as a function of position a of throttle valve 15 and, optionally, as a function of measured actual value pl of the boost pressure; in this case a first multidimensional engine characteristics map is denoted by reference numeral 105 and a second multidimensional engine characteristics map is denoted by reference numeral 110. In this case, reference numeral 105 represents a third modeling unit for modeling conversion factor fupsrl and reference numeral 110 represents a fourth modeling unit for modeling partial pressure pbr.

In supercharged engines, i.e., in the case when compressor 130 is present, the torque, i.e., the power delivered by internal combustion engine 1, is often limited by limiting the charge to a predefined maximum rlmax. This predefined maximum rlmax limits the setpoint for the charge. However, no setpoint is predefined for the charge at full load of the engine, and instead a setpoint is defined for the boost pressure, so predefined maximum rlmax for the charge must be converted to a predefined maximum plmax for the boost pressure. This is also done with the help of adapted conversion factor fupsrl' and, if necessary, with the help of adapted partial pressure pbrint'. At full load, throttle valve 15 is completely open, so the intake-manifold pressure is equal to the boost pressure. The maximum power, i.e., maximum torque, of internal combustion engine 1 is calculated largely correctly here with the help of the modeled intake-manifold pressure, i.e., boost pressure corrected in the manner described here for particular internal combustion engine 1. Thus, manufacturing tolerances in engine parts and component tolerances of all the adjusting elements and sensors involved may no longer be manifested by a significant deviation in the power actually delivered by internal combustion engine 1 from the desired setpoint power, which is limited, if necessary.

However, it may be appropriate to employ one or more other restrictions or to specify conditions for obtaining a better learning behavior and/or a more rapid convergence of the adaptation mechanism described. Such restrictions or conditions may be provided as follows:

a) no recognized defects in the sensors and actuators in air supply 50;
b) the system has reached a “steady state,” i.e., the change in the intake-manifold pressure and/or the boost pressure and/or the engine speed over time is below a calibratable threshold;
c) the intake air temperature is within a calibratable interval;
d) the rate of change of the throttle valve setting is below a calibratable threshold; and
e) at least one of the conditions listed above must be met for a calibratable period of time before the adaptation is enabled.

What is claimed is:

1. A method for operating an internal combustion engine, comprising:

performing a modeling of a value for a first performance quantity of the internal combustion engine as a function of at least one second performance quantity, wherein the second performance quantity is a charge of the internal combustion engine and is different from the first performance quantity; and correcting the modeling as a function of a comparison of the modeled value for the first performance quantity with a measured value for the first performance quantity, wherein the correction is performed differently for each one of different operating points of the internal combustion engine.

2. A method for operating an internal combustion engine, comprising:

performing a modeling of a value for a first performance quantity of the internal combustion engine as a function of at least one second performance quantity, wherein the second performance quantity is a charge of the internal combustion engine and is different from the first performance quantity; and correcting the modeling as a function of a comparison of the modeled value for the first performance quantity with a measured value for the first performance quantity, wherein the correction is performed differently for each one of different operating points of the internal combustion engine.

wherein the first performance quantity is a pressure in an air supply channel to the internal combustion engine.

3. The method as recited in claim 2, wherein the measured value for the pressure in the air supply channel is ascertained by a first pressure sensor located downstream from a throttle valve, wherein the throttle valve influences the flow behavior of the air supplied to the internal combustion engine.

4. The method as recited in claim 2, wherein a conversion factor for conversion between the at least one second performance quantity and the first performance quantity is taken into account in the modeling, and wherein the conversion factor is corrected as a function of the comparison of the modeled value for the first performance quantity with the measured value for the first performance quantity.

5. The method as recited in claim 2, wherein a third performance quantity of the internal combustion engine is taken into account in the modeling, and wherein the third performance quantity is corrected as a function of the comparison of the modeled value for the first performance quantity with the measured value for the first performance quantity, and wherein the third performance quantity is a partial pressure of a residual gas in a combustion chamber of the internal combustion engine.

6. The method as recited in claim 2, wherein the correction of the modeling takes into account an operating point defined by at least one of an engine speed and the charge of the internal combustion engine.

7. The method as recited in claim 2, wherein the measured value for the pressure in the air supply channel is ascertained by a second pressure sensor located upstream from a throttle valve, wherein the throttle valve influences the flow behavior of the air supplied to the internal combustion engine.

8. The method as recited in claim 7, wherein the measured value for the pressure in the air supply channel is ascertained oniy for operating points of the internal combustion engine at which the throttle valve assumes a position in which the throttle valve has only an insignificant influence on the flow behavior of the air supplied to the internal combustion engine.

9. The method as recited in claim 8, wherein the measured value for the pressure in the air supply channel is ascertained only for operating points of the internal combustion engine at which the throttle valve is completely open.

10. A system for operating an internal combustion engine, comprising:

a modeling unit for performing a modeling of a value for a first performance quantity of the internal combustion engine as a function of at least one second performance quantity, wherein the second performance quantity is a charge of the internal combustion engine and is different from the first performance quantity;

a detection unit for detecting an operating point of the internal combustion engine; and a correction unit for correcting the modeling as a function of a comparison of the modeled value for the first performance quantity with a measured value for the first performance quantity, wherein the correction unit performs the correction differently for each one of different detected operating points of the internal combustion engine.

11. The system as recited in claim 10, wherein the first performance quantity is a pressure in an air supply channel to the internal combustion engine.

12. The system as recited in claim 11, wherein the measured value for the pressure in the air supply channel is ascertained by a first pressure sensor located downstream from a throttle valve, wherein the throttle valve influences the flow behavior of the air supplied to the internal combustion engine.

13. The system as recited in claim 11, wherein a conversion factor for conversion between the at least one second performance quantity and the first performance quantity is taken into account in the modeling, and wherein the conversion factor is corrected as a function of the comparison of the modeled value for the first performance quantity with the measured value for the first performance quantity.

14. The system as recited in claim 11, wherein a third performance quantity of the internal combustion engine is taken into account in the modeling, and wherein the third performance quantity is corrected as a function of the comparison of the modeled value for the first performance quantity with the measured value for the first performance quantity, and wherein the third performance quantity is a partial pressure of a residual gas in a combustion chamber of the internal combustion engine.

15. The system as recited in claim 11, wherein the correction of the modeling takes into account an operating point defined by at least one of an engine speed and the charge of the internal combustion engine.

16. The system as recited in claim 11, wherein the measured value for the pressure in the air supply channel is ascertained by a second pressure sensor located upstream from a throttle valve, wherein the throttle valve influences the flow behavior of the air supplied to the internal combustion engine.

17. The system as recited in claim 16, wherein the measured value for the pressure in the air supply channel is ascertained only for operating points of the internal combustion engine at which the throttle valve assumes a position in which the throttle valve has only an insignificant influence on the flow behavior of the air supplied to the internal combustion engine.

18. The system as recited in claim 17, wherein the measured value for the pressure in the air supply channel is ascertained only for operating points of the internal combustion engine at which the throttle valve is completely open.

* * * * *